United States Patent [19]

Miller

[11] Patent Number: 4,813,235
[45] Date of Patent: Mar. 21, 1989

[54] HYDRAULIC GAIN REDUCTION CIRCUIT

[75] Inventor: James A. Miller, Cedar Falls, Iowa

[73] Assignee: Deere & Company, Moline, Ill.

[21] Appl. No.: 60,150

[22] Filed: Jun. 9, 1987

[51] Int. Cl.⁴ .............................................. F16D 31/02
[52] U.S. Cl. ......................................... 60/452; 60/445
[58] Field of Search ............... 417/213, 218, 219, 220, 417/221, 222; 60/445, 450, 452; 137/596, 596.13

[56] References Cited

U.S. PATENT DOCUMENTS

| Re. 29,673 | 6/1978 | Van Gerpen . | |
| 3,826,090 | 7/1974 | Bahl | 60/452 X |
| 3,995,425 | 12/1976 | Wittren | 60/452 X |
| 4,065,922 | 1/1978 | Ott et al. | 60/445 |
| 4,194,363 | 3/1980 | Young | 60/452 X |
| 4,292,805 | 10/1981 | Acheson | 60/450 |
| 4,293,284 | 10/1981 | Carlson et al. . | |
| 4,336,687 | 6/1982 | Morgan . | |
| 4,362,087 | 12/1982 | Budzich . | |
| 4,418,710 | 12/1983 | Johnson . | |
| 4,481,770 | 11/1984 | Lohbauer et al. | 60/445 X |
| 4,648,803 | 3/1987 | Stephenson | 417/214 X |

Primary Examiner—Edward K. Look

[57] ABSTRACT

A gain reduction circuit is provided for use with a pressureflow compensated variable displacement pump in a power-on-demand hydraulic system. An orifice and a check valve are connected in parallel between a pressure-flow compensating valve and the control for the variable displacement pump. A second orifice is connected between the pump control and sump. A relief valve is connected in parallel with both orifices. The circuit operates to allow a quick increase in pump output, while damping variations in the pump control to prevent or minimize oscillation of the pump outlet pressure around the desired value. In alternative embodiments, the check valve may be omitted if larger orifices are used, or the check valve may be provided and the second orifice omitted.

19 Claims, 1 Drawing Sheet

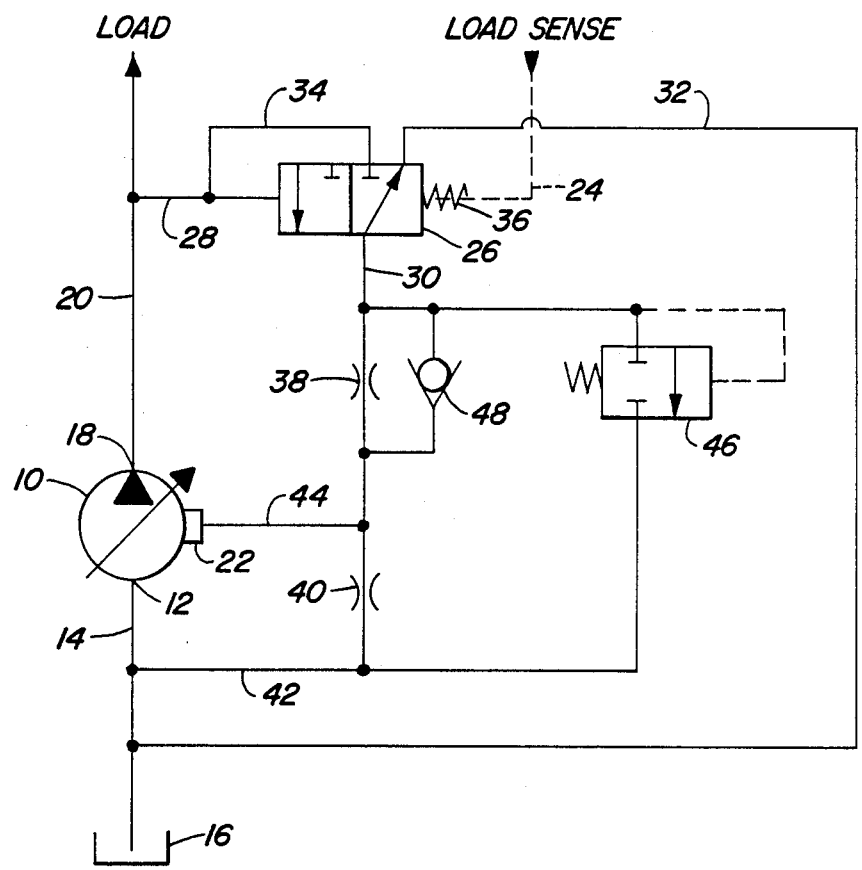

HYDRAULIC GAIN REDUCTION CIRCUIT

BACKGROUND OF THE INVENTION

1. Field of the Invention

The present invention relates to hydraulic circuits for controlling variable hydraulic members, and particularly pressure-flow compensated variable displacement pumps in power-on-demand circuits.

2. Description of the Related Art

Pressure-flow compensated variable displacement pumps often are used in power-on-demand hydraulic circuits to reduce the energy consumption of the hydraulic system by limiting the output of the pump to the load requirements of the system. A typical use for such a system is in a work vehicle, e.g., agricultural or industrial equipment. In such an application, the output of the pump is throttled back to a minimum level when there is no load demand on the hydraulic system. As the load increases, the output of the pump is increased.

U.S. Pat. No. 4,293,284 (Carlson et al.) teaches a circuit for controlling a variable displacement pump in such a fashion. The output of Carlson's pump 12 increases as the pressure at the pump control piston 22 decreases, and vice-versa. Since the pressure vs. flow characteristics controlling the output of the pump vary depending on the load, a pressure-flow compensating valve 28 is provided to adjust the pressure applied to the control piston 22. The two-position valve 28 is biased towards a first position connecting the control piston 22 to sump and a second position connecting the control piston 22 to the outlet of the pump. A load sense line 46 conveys a pressure representative of the load demand on the pump to one end of the valve 28, moving it towards the first position, while the pressure at the pump outlet is applied to the other side of the valve. With this arrangement, the pressure output of the pump will keep increasing until it exceeds the load demand on the pump by the amount necessary to overcome the spring biasing valve 28.

The Carlton et al. arrangement has problems due to lag times. The load demand pressure takes a small but significant amount of time to travel through the load sense line 46 back to the pressure-flow compensating valve 28. However, due to the normal positioning of these valves immediately adjacent to the pump, the pump outlet pressure is applied to the valve almost immediately. As a result, the pump typically will overshoot the desired pressure, in both directions, that is, when the pressure should be increasing, it will increase too much and when it should be decreasing, it will decrease too much. As a result, the pump outlet pressure oscillates around the desired pressure rather than promptly stabilizing at that pressure.

U.S. Pat. No. Re. 29,673 (Van Gerpen) teaches a more complicated load sense circuit in which the pressure is conditioned before reaching the control piston 32, though the pressure remains representative of the load demand on the pump. In addition to this conditioning, the Van Gerpen reference differs from the Carlson et al. reference in providing orifice 56 connecting the pump control piston 32 to sump. The orifice 56 assures a minimum pressure differential between the sump and the control piston whenever any pressure is provided through the line 54 from the load sense circuitry. In Carlson et al.'s circuit, there can be flow to and from the control piston 22, but not past it. In contrast, in Van Gerpen, there is flow past the control piston 32 through the orifice 56.

SUMMARY OF THE INVENTION

The present invention is directed to eliminating the aforementioned oscillation problems.

In the most preferred embodiment, the present invention provides two orifices connected in series between a two-position flow compensating valve and sump or the inlet of a variable displacement pump (for purposes of convenience, throughout this specification sump and the pump inlet are considered substantially equivalent). The control piston for the pump is connected between the two orifices. A relief valve is connected in parallel with the two orifices allowing flow from the flow-compensating valve to sump. A check valve is connected in parallel with the orifice closest to the flow-compensating valve, that is, between the flow-compensating valve and the line intermediate the two orifices. The check valve allows flow from the line intermediate the orifices towards the flow-compensating valve, but not vice-versa.

In an alternative embodiment, the check valve can be eliminated if larger orifices are provided.

In a still further embodiment, the check valve is provided, but the orifice connecting the pump control piston to sump is eliminated, that is, flow past the pump control piston is eliminated.

With any of these constructions, the present circuit damps out the oscillations which were a problem in the Carlson et al. circuit. With proper proportioning of the orifices and relief valve opening pressure, the pump will directly approach the desired output pressure rather than oscillating around it. Even if the elements are not perfectly proportioned, they will provide a damping envelope in which the pump quickly will approach the desired output pressure.

BRIEF DESCRIPTION OF THE DRAWING

The present invention will be described in more detail below with reference to the single FIGURE illustrating a schematic of the circuit according to the present invention.

DETAILED DESCRIPTION OF THE PREFERRED EMBODIMENTS

Referring to the FIGURE, a variable displacment pump 10 has an inlet 12 connected to sump 16 via line 14 and an outlet 18 connected to a hydraulic load (not shown) via line 20. The displacement of the pump is controlled by a pump control 22, e.g., a control piston.

A load sense line 24 has a pressure therein representative of the load demand on the pump. The, pressure in the load sense line 24 is applied to one end of a three-port, two-position, pressure-compensating control valve 26, preferably of the spool type. Line 28 applies the pressure in the pump outlet line 20 to the other end of the control valve 26. The control valve 26 has a first position connecting a main orifice line 30 to sump 16 via line 32 and a second position connecting main orifice line 30 to the pump outlet line 20 via lines 28 and 34. The control valve 26 is biased towards the first position by a spring 36.

Two orifices 38, 40 are provided on the main orifice line 30. The end of the main orifice line 30 opposite from the control valve 36 then is connected to sump through lines 42 and 14. The pump control 22 is connected to the main orifice line 30 intermediate the orifices 38, 40 via control line 44. Orifice 38 is located between control valve 26 and line 44 and orifice 40 is located between line 44 and sump 16. The pump control 22 increases the pump output as the pressure in control line 44 decreases, and decreases it as the control line pressure increases.

A relief valve 46 is connected in parallel with the two orifices 38, 40 between the control valve 26 and sump 16.

Finally, a check valve 48 is connected in parallel with the orifice 38 such that flow through the check valve 48 can occur from a point in the main orifice line 30 intermediate the orifices 38, 40 to the control valve 26, but not vice-versa.

OPERATION

Assume the pump is in a standby, i.e., low output mode. When a load is applied to the system, the combined force of the spring 36 and the pressure in the load sense line 24 will move the load control valve 26 into its first position, as shown in the FIGURE. This connects the main orifice line 30 to sump 16. The pressure in the control line 44 is reduced quickly by flow through the check valve 48, bypassing the orifice 38. The pump output therefore promptly increases, as desired. As the pressure in the pump outlet line 20 increases to the point where it can overcome both the pressure in load sense line 24 and the biasing force of spring 36, the valve 26 will move into its second position, connecting the pump outlet line 20 to the main orifice line 30. Now the check valve 48 closes and the pressure increase can be transmitted only slowly through the orifice 38. The bulk of the flow and the pulse caused when the outlet line is suddenly connected to the main orifice line 30 pass through the relief valve 46 instead. The opening pressure of the relief valve 46 has properly been set to serve this purpose. The pressure in the control line 44 gradually increases, in turn causing the output of the pump to gradually decrease. This is a comparatively slow process, allowing time for any feedback through the load sense line 24 to occur.

Assuming there is no alteration in the feedback through load sense line 24, the pressure in the outlet line 20 will decrease until it exceeds the pressure in the load sense line 44 only by the force required to overcome the spring 36. In effect, the pressure required to overcome the force of the spring 36 becomes the standby pressure of the pump.

As may be seen, the pressure in the load line normally will be maintained greater than the pressure in the load sense line by at least the amount of the force required to overcome the spring 36. Should a sudden increase in load arise, the pump pressure will increase quickly due to flow through the check valve 48. Overshooting of the desired pressure is minimized by provision of the orifices 38, 40.

As an example of a particular embodiment, the present invention has been constructed using a John Deere variable displacement radial piston pump having a maximum displacement of 65 cm$^3$ per revolution in a system requiring a maximum pressure of 225 bar. Orifice 38 preferably has a diameter of about 2.5 mm and orifice 40 a diameter of about 1.5 mm, allowing a maximum flow through the orifices of about 0.04 liters/second. The relief valve allows a typical flow of about 0.03 liters/second and is set to open at a pressure of about 3 bar. In contrast, the check valve 48 is sized to allow a much higher flow, on the order of 0.2 liters per second. The control valve spring 36 is set to require a pressure differential of about 20 bar between the pump outlet line 20 and the load sense line 24 to shift the control valve 26 from its first to second position. In effect, the standby pressure of the pump is set at about 20 bar.

Various modifications to the present circuit also can be made. If orifices 38, 40 are provided with larger diameters, the check valve 48 can be omitted. Orifice 38 then could be about 3.0 mm and orifice 40 about 2.5 mm, allowing a maximum flow of 0.13 liters/second when used in the system discussed in the prior paragraph. While this provides damping, it has the disadvantage of having a relatively large parasitic flow (0.13 liters/second), so it generally is preferable to use the smaller orifices with the check valve.

A further alternative is to provide the orifice 38 and check valve 48 but omit the orifice 40 and its connecting line, i.e., provide a system where fluid can flow to and from the control line 44, but not past it.

Further modifications to the present invention will be apparent to one of ordinary skill in the art. For example, while the present invention has been described for use with a pressure-flow compensating variable displacement pump, it would be possible to use the same circuit to control some other variable hydraulic component, such as a pressure compensated pump or a valve. Accordingly, the present invention is not intended to be limited to the embodiments described herein but only by the following claims.

I claim:

1. A gain control circuit for a variable hydraulic member having an inlet, an outlet and controlled by the pressure in a control line, the circuit comprising:
    demand valve means having a first position for connecting said control line to said inlet and a second position for connecting said control line to said outlet;
    a load sense line the pressure in which is representative of a load demand on said hydraulic member, said demand valve means position being controlled by a difference between said load sense line pressure and the pressure at said outlet;
    flow-limiting means for limiting flow rate therethrough and interconnecting said demand valve means and said control line;
    uni-directional flow means connected in parallel with said flow limiting means for allowing flow therethrough from said control line towards said demand valve means and preventing flow from said demand valve means towards said control line; and
    relief means for allowing flow therethrough towards said inlet from a demand valve means side of said flow-limiting and uni-directional flow means when the pressure at said side exceeds a pre-determined value.

2. The gain control circuit of claim 1, wherein said demand valve means is biased towards said first position.

3. The gain control circuit of claim 1, wherein said hydraulic member is selected from the group consisting of a valve and a variable displacement pump.

4. The gain control circuit of claim 3, wherein said hydraulic member comprises a variable displacement radial piston pump, the displacement of said pump increasing as the pressure in said control line decreases and decreasing as the pressure in said control line increases.

5. The gain control circuit of claim 1, wheren said unidirectional flow means comprises a check valve.

6. The gain control circuit of claim 1, wherein said flow-limiting means comprises an orifice.

7. The gain control circuit of claim 1, wherein said unidirectional flow means allows a typical flow therethrough approximately one order of magnitude greater than the typical flow allowed through either of said flow-limiting means and said relief means.

8. The gain control circuit of claim 7, wherein said flow-limiting means allows a flow therethrough of about 0.04 liters/second, said uni-directional flow means a flow of about 0.2 liters/second and said relief means a flow of about 0.03 liters/second.

9. The gain control circuit of claim 1, further comprising second flow-limiting means for limiting flow rate therethrough and interconnecting said control line and said inlet.

10. The gain control circuit of claim 9, wherein said first flow-limiting means is an orifice having a diameter of about 2.5 mm and said second flow-limiting means is an orifice having a diameter of about 1.5 mm.

11. A gain control circuit for a variable hydraulic member having an inlet, an outlet and controlled by the pressure in a control line, the circuit comprising:
   demand valve means having a first position for connecting said control line to said outlet and a second position for disconnecting said control line from said outlet;
   a load sense line the pressure in which is representative of a load demand on said hydraulic member, said demand valve means position being determined by a difference between said load sense line pressure and the pressure at said outlet;
   first flow-limiting means for limiting flow rate therethrough and interconnecting said demand valve means and said control line;
   second flow-limiting means for limiting flow rate therethrough and interconnecting said control line and said inlet; and
   relief means for allowing flow therethrough towards said inlet from a demand valve means side of said first flow-limiting means when the pressure at said side exceeds a pre-determined value.

12. The gain control circuit of claim 11 in said demand valve means is biased towards said second position.

13. The gain control circuit of claim 11, wherein said hydraulic member is selected from the group consisting of a valve and a variable displacement pump.

14. The gain control circuit of claim 13, wherein said hydraulic member comprises a variable displacement radial piston pump, the displacement of said pump increasing as the pressure in said control line decreases and decreasing as the pressure in said control line increases.

15. The gain control circuit of claim 11, wherein each said flow-limiting means comprises an orifice.

16. The gain control circuit of claim 15, wherein said first flow-limiting means has a diameter of about 3.0 mm, said second flow-limiting means has a diameter of about 2.5 mm and the maximum flow rate through said flow-limiting means is about 0.13 liters/second.

17. A gain control circuit for a pressure-on-demand variable displacement pump having an inlet and an outlet, the circuit comprising:
   a control line, the pressure in which regulates the displacement of the pump;
   a demand valve having a first position connecting said control line to the pump inlet and a second position connecting said control line to the pump outlet, said demand valve being biased towards aid first position;
   a load sense line the pressure in which is representative of a load demand on said pump, said demand valve position being controlled by a difference between said load sense line pressure and the pressure at said pump outlet;
   a flow-limiting orifice interconnecting said demand valve and said control line;
   a check valve connected in parallel with said orifice to allow flow therethrough from said control line towards said demand valve, but not from said demand valve towards said control line; and
   a relief valve allowing flow towards said pump inlet from a demand valve side of said orifice and said check valve when the pressure at said side exceeds a pre-determined value.

18. The gain control circuit of claim 17, wherein said check valve allows a typical flow therethrough approximately one order of magnitude greater than the typical flow allowed through either of said orifice and said relief valve.

19. The gain control circuit of claim 17, further comprising a second flow-limiting orifice interconnecting said control line and said pump inlet.

* * * * *